Figure 1:
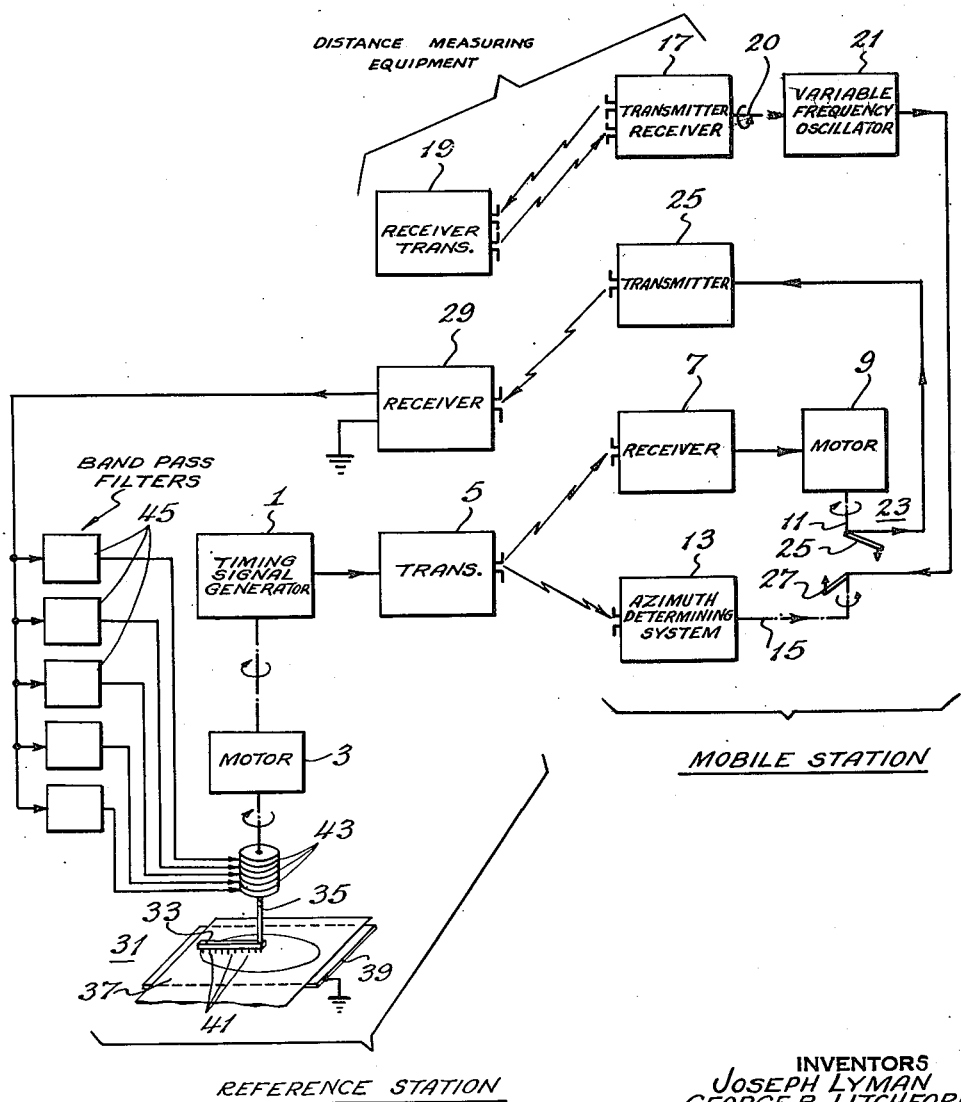

Oct. 28, 1952 J. LYMAN ET AL 2,616,076
AIR TRAFFIC CONTROL SYSTEM
Filed April 20, 1949 2 SHEETS—SHEET 1

INVENTORS
JOSEPH LYMAN
GEORGE B. LITCHFORD
BY
Paul B. Hunter.
ATTORNEY

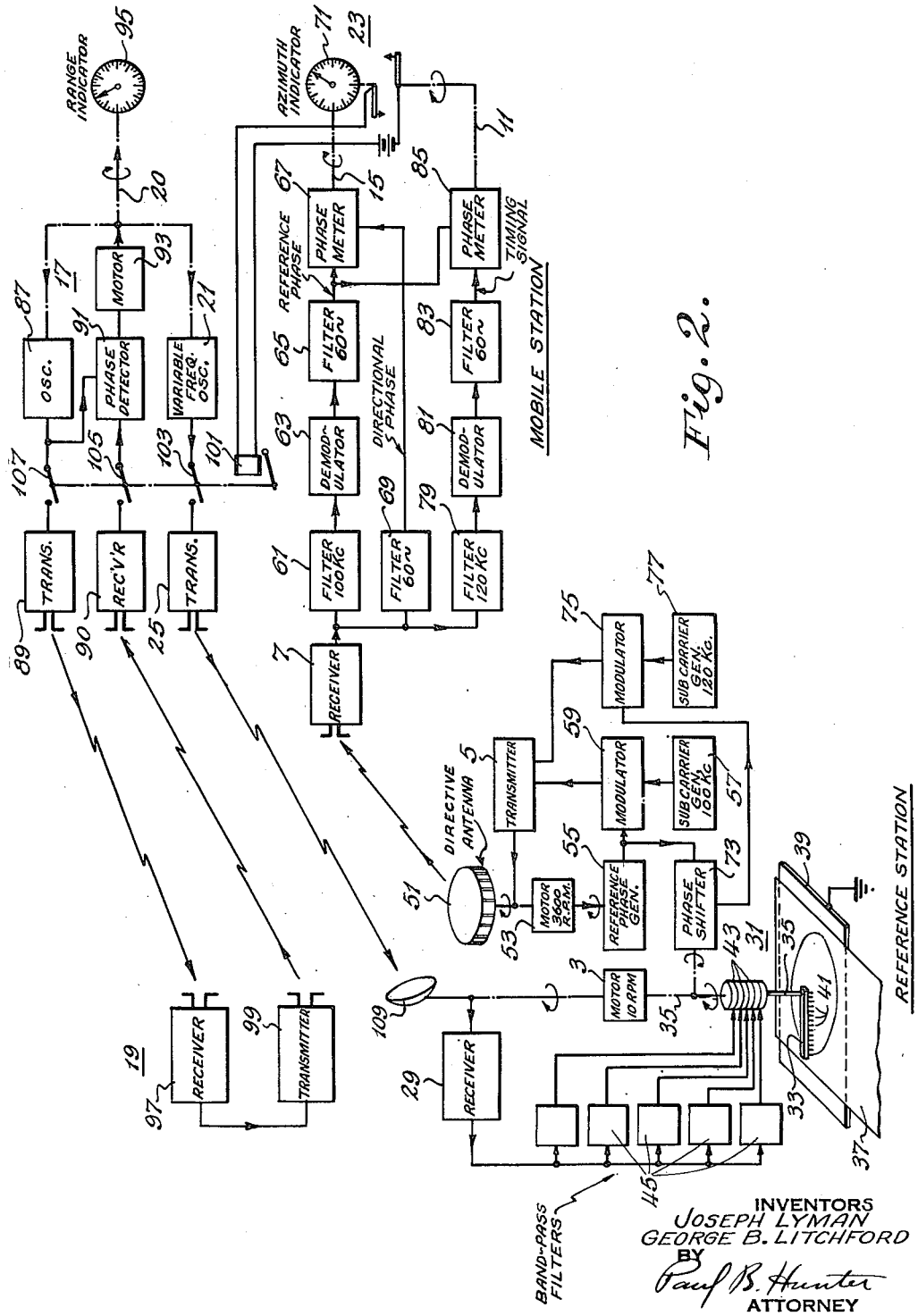

Patented Oct. 28, 1952

2,616,076

UNITED STATES PATENT OFFICE 2,616,076

AIR TRAFFIC CONTROL SYSTEM

Joseph Lyman and George B. Litchford, Huntington, N. Y., assignors to The Sperry Corporation, a corporation of Delaware Application April 20, 1949, Serial No. 88,522

10 Claims. (Cl. 343—5)

This invention relates to improvements in air traffic control systems and the like, and particularly to systems for producing a visual display showing the positions of aircraft or other mobile craft within a service area surrounding a reference station.

According to the principles of the invention, each aircraft or mobile station with which the system is to be used includes means for determining the distance and direction of the respective mobile station from the reference station. This information may be indicated or displayed at the respective mobile station and is in addition transmitted to the reference station. A device such as a facsimile recorder at the reference station is actuated by the signals from the various mobile stations to depict the respective positions thereof on a common visual display.

One of the principal objects of the present invention is to provide methods and means for conveying the above mentioned positional information from the mobile craft to the display device at the reference station.

Another important object is to achieve the foregoing object while substantially avoiding interference between the transmissions from two or more mobile stations.

A further object of the invention is to provide a system of the described type wherein the various mobile stations are "interrogated" in a sequence depending upon their respective directions from the reference station, and respond by reporting their respective distances.

The invention will be described with reference to the accompanying drawings, wherein:

Fig. 1 is a schematic block diagram of a position determining and indicating system embodying the elements of the present invention, and Fig. 2 is a schematic block diagram showing a system like that of Fig. 1 in more detail.

Referring to Fig. 1, the reference station includes a timing signal generator 1 and a motor 3 which runs at a nominally constant speed. The generator 1 and the motor 3 are coupled together so that the rotation of the motor is synchronous with the signals from the generator. This may be accomplished either by having the motor 3 drive the generator 1, or by making the output of the generator control the motor. The generator 1 produces a periodically recurrent signal such as a pulse or a wave which begins a cycle each time the shaft of the motor 3 passes through a certain angular position.

The output of the timing signal generator 1 is applied to a transmitter 5 and transmitted thereby to all the mobile stations with which the system is to operate, including the one shown at the right hand side of Fig. 1. Substantially any number of other mobile stations, all similar to the one shown in Fig. 1, may be used in cooperation with the reference station.

The mobile station includes a receiver 7 responsive to the transmitter 5 to reproduce the timing signals originated by the generator 1. A motor 9 is controlled by the reproduced timing signals to drive its shaft 11 in synchronism with that of the motor 3 at the reference station. An azimuth determining system 13 controls the angular position of a shaft 15 in accordance with the azimuth or direction of the mobile station from the reference station. The terms azimuth and direction as used herein are intended to mean the angle between a reference line, such as a meridian through the reference station, and a line from the reference station to the mobile station. Thus the azimuth is not related to the heading or direction of motion of the mobile station, but is simply the direction of the mobile station from the reference station.

The azimuth determining system responds to transmissions from the reference station, for example to signals transmitted by the transmitter 5, and it may include a radio direction finder and an earth compass arranged in known manner to rotate the shaft 15 according to azimuth. Alternatively, and preferably, the azimuth determining system may be of the omnidirectional radio range type, as will be explained in connection with Fig. 2 of the drawings.

Radio distance measuring equipment (D. M. E.) is provided for determining the distance of the mobile station from the reference station. This apparatus includes two units, a transmitter-receiver 17 at the mobile station and a "transponder" 19 at the reference station. The transponder 19 comprises a receiver and a transmitter controlled by the output of the receiver to retransmit signals received from the mobile unit 17. The mobile station unit 17 includes means for measuring the timing or phase of the transmitted signals with respect to the received return signals, and for rotating a shaft 20 accordingly. Since the delay of the received signals with respect to the transmitted signals depends upon the time required for radiation to travel the round trip between the two stations, the position of the shaft 20 corresponds to the distance.

The shaft 20 is coupled to a variable frequency oscillator 21. The frequency of the oscillator 21 is controlled by the shaft 19 and thus depends upon and is a measure of the distance of the respective mobile station from the reference station. The output of the oscillator 21 is applied through a switch 23 to a transmitter 25. The switch 23 includes two relatively movable contact members 25 and 27, which may, for example, be rotatable about a common axis by the shafts 11 and 15 respectively. The contacts engage each other only when the angular positions of the two shafts substantially correspond with each other.

A receiver 29 at the reference station is designed to respond to the mobile station transmitter 25, as well as to the corresponding transmitters of any other similar mobile stations. The output of the receiver 29 is applied to an indicator or display system 31, which may include a polar facsimile recorder of the type described in copending U. S. patent application Serial Number 782,848, filed October 29, 1947, by Joseph Lyman et al. and entitled Craft Position Plotting System. The recorder includes an arm 33 extending radially from a shaft 35 which is coupled to the motor 3 and driven thereby to sweep the arm 33 over a circular area on a sheet 37 of sensitized facsimile recording paper supported on a flat plate 39. The arm 33 carries a plurality of styli 41 spaced at small intervals radially from the shaft 35, each connected to a respective one of a plurality of slip rings 43 on the shaft 35. Each slip ring is connected through a brush to an output terminal of one of a bank of filters 45. The filters 45 are designed to pass different relatively narrow frequency bands, each comprising a limited portion of a relatively wide continuous spectrum. The input terminals of the filters 45 are connected to the receiver 29.

In the operation of the system of Fig. 1, the distance measuring equipment 17, 19 adjusts the frequency of the oscillator 21 to a value corresponding to the distance of the mobile station from the reference station. The azimuth determining system sets the contact 27 of the switch 23 to a position corresponding to the direction or azimuth of the mobile station from the reference station. The contact 25 of the switch 23 moves in synchronism with the arm 33 of the recorder at the reference station, so that whenever the angular position of the arm 33 corresponds to the azimuth of the mobile station, the switch 23 closes.

Upon closure of the switch 23, the output of the variable frequency oscillator 21 is applied momentarily to the transmitter 25 and is reproduced at the reference station by the receiver 29. The signal is selected by one of the filters 45 according to its frequency and is applied to the one of the styli 41 whose distance from the axis of the arm 33 corresponds to the distance of the mobile station from the reference station. Thus energized momentarily, the stylus produces a small mark on the paper 37 at a position corresponding to that of the mobile station.

During successive rotations of the arm 33 and the shaft 11, the described operation is repeated. If the mobile station is in motion, the successive marks produced on the paper 37 will lie on a line representing the track or path followed by the mobile station. It will be apparent that other mobile stations at different azimuths will report their distances at different instants, and mobile stations at different distances will transmit signals of correspondingly different frequencies. Thus the number of mobile stations which can be dealt with substantially continuously by a single reference station is not limited by the described system of position reporting and display.

Referring now to Fig. 2, wherein parts similar to those of Fig. 1 are designated by corresponding reference characters, the azimuth determining system comprises an omnidirectional ratio range, wherein the reference station transmits a rotating directional pattern and a reference phase signal, and the mobile station includes means to compare the phase of the modulation produced by pattern rotation with that of the reference phase signal to determine azimuth. The omnidirectional range may be of any known type, for example that described and shown in copending U. S. patent application Serial No. 782,722, filed October 29, 1947, by George B. Litchford et al., now Patent No. 2,564,703 granted August 21, 1951, and entitled Omni-Azimuth Guidance System. Although said system includes means for both coarse and fine determination of azimuth, only the coarse portion will be described herein because that is all that is necessary for a clear understanding of the present invention.

A directive antenna 51, designed to provide a heart-shaped or limacon pattern, is rotated continuously at a nominally constant speed of, for example, 3600 R. P. M., by a motor 53. The transmitter 5 is connected to the antenna 51. A reference phase generator 55, which may be a simple alternator, is also driven by the motor 53 and provides an output of frequency equal to that of the antenna rotation, i. e. 3600 cycles per minute or 60 cycles per second. A subcarrier generator or oscillator 57 provides a signal of, say 100 kilocycles per second, which is modulated in a modulator 59 by the output of the reference phase generator 55. The modulated subcarrier is applied to the transmitter 5 to modulate the main carrier, which may be of a superhigh frequency such as 5000 megacycles per second. It will be understood that the modulation in each case may be either amplitude or frequency modulation.

At the mobile station, the 100 kilocycle subcarrier in the output of the receiver 7 passes through a filter 61 to a demodulator 63. The output of the demodulator 63 includes a 60 cycle component corresponding to the output of the reference phase generator 55, and this passes through a filter 65 to a phase meter 67.

Owing to the rotation of the antenna 51, the 5000 megacycle carrier received at the receiver 7 varies in amplitude 60 times per second. This provides a 60 cycle component in the output of the receiver whose phase depends upon the azimuth of the mobile station. This component, which may be called the directional phase signal, goes through a filter 69 to the phase meter 67. The phase meter may be of known type, rotating the indicator shaft 15 in accordance with variations in the phase relationship between the two input signals. A dial and pointer arrangement 71, calibrated in terms of azimuth, may be connected to the shaft 15.

The timing signal is provided in the system of Fig. 2 as follows: A phase shifter 73 is coupled to the motor 3 and driven thereby in synchronism with the recorder shaft 35. The rate of rotation may be of the order of ten revolutions per minute. The output of the phase shifter 73 is thus a 60 cycle signal like the reference phase signal, but varying continuously in phase with respect thereto, at the rate of 360 degrees per rotation of the recorder shaft 35. This signal is applied to a modulator 75, where it modulates a subcarrier generator by a subcarrier generator 77. The frequency of this subcarrier may be 120 kilocycles per second, for example, and after modulation by the varying-phase timing signal it is applied to the transmitter 5.

At the mobile station, a filter 79 separates the 120 kilocycle subcarrier from the output of the receiver 7 and applies it to a demodulator 81 like the demodulator 65. A filter 83 passes the 60 cycle varying phase signal to a phase meter 85 which may be like the phase meter 67. The phase meter 85 drives the shaft 11. Since the phase relation between the two inputs to the phase meter 85 corresponds at every instant to the angular position of the recorder shaft 35, the shaft 11 is rotated in synchronism with the shaft 35.

The mobile station portion 17 of the distance measuring equipment includes an oscillator 87 which modulates a transmitter 89. The oscillator 87 is also connected to a phase detector 91. The phase detector has a second input circuit which is connected to the output terminals of a receiver 90.

The output of the phase detector energizes or controls the energization of a motor 93 to drive the shaft 29. An indicator 95, calibrated in terms of distance, is coupled to the shaft 29. The shaft 29 is also coupled to the oscillator 87 so as to control its frequency.

The reference station portion 19 of the distance measuring equipment includes a receiver 97 designed to respond to the transmitter 89, and a transmitter 99 which is modulated by the output of the receiver 97 and is designed to operate at the same frequency as the mobile station receiver 90.

In the operation of the distance measuring equipment, the output of the oscillator 87 is transmitted to the reference station and returned to the mobile station, by way of the transmitter 89, receiver 97, transmitter 99, and receiver 90. The output of the receiver 90 is like that of the oscillator 87, but is delayed with respect thereto by the length of time required for radiation to make the round trip between the mobile station and the reference station.

The phase detector 91 will produce no output if the two inputs to it are 90 degrees out of phase. If they are less than 90 degrees out of phase, the phase detector 91 will energize the motor 93 to run in such direction as to increase the frequency of the oscillator 87. Conversely, if the two inputs are more than 90 degrees out of phase, the frequency of the oscillator 87 will be decreased. In either event, the frequncy is adjusted to a value such that the time for one quarter cycle (90 degrees) of the oscillator output is equal to the radiation travel time. Thus the angular position of the shaft 29 will depend upon the distance of the mobile station from the reference station.

The switch 23, instead of operating directly upon the connection between the oscillator 21 and the transmitter 25 as in the system of Fig. 1, actuates a relay 101 to close momentarily contacts 103, 105 and 107. The contacts 107 connect the oscillator 21 to the transmitter 25. The contacts 105 connect the receiver 99 to the phase detector 91, and the contacts 107 connect the oscillator 87 to the transmitter 89.

Another modification in the system of Fig. 2 is in the provision of a highly directive antenna 109 for the receiver 29 at the reference station. This antenna is rotated by the motor 3 in synchronism with the recorder shaft 35, and always "points" in the direction from which a transmission may be received from a mobile station at any particular instant. The antenna 109 may also be used for the reciver 97 of the distance measuring equipment 19, although a separate antenna is indicated in Fig. 2 to avoid confusion.

The operation of the system of Fig. 2 is substantially the same as that of Fig. 1. The switch 23 at any particular mobile station closes momentarily each time the recorder arm 33 at the reference station passes through an angular position corresponding to the azimuth. This connects the distance reporting oscillator 21 to the transmitter 25; at this same time the directive antenna 109 at the reference station is pointed toward the mobile station.

It is possible and preferable under certain circumstances to design this antenna 109 to have such a narrow beam that the length of the time during which signals can be received from the mobile station transmitter 25 is determined by the antenna 109 rather than by the period of closure of the switch 23. The overall operation of the system will be the same except that the marks produced on the recording paper 37 may be somewhat smaller and more accurately positioned in azimuth.

The relay contacts 105 and 107 prevent operation of the radio elements of the mobile distance measuring equipment except during the brief instants during each timing cycle when the switch 23 is closed. The distance information is nevertheless continuously available at the indicator 95, simply being corrected if necessary each time the switch 23 closes. Since each mobile transmitter 89 operates only at instants corresponding to the azimuth of the respective mobile station, no interference can occur as a result of two mobile stations at the same distance from the reference station transmitting signals of substantially equal frequency to the receiver 97. Also, since the receiver 90 is disconnected except when the transmitter 89 operates, signals transmitted from the reference station transmitter in response to signals from other mobile stations at different azimuths will not reach the phase detector 91.

Although the described embodiments are representative of the invention of the presently preferred form, it will be understood that various modifications may be made in carrying out the principles thereof. For example, a single transmitter at the mobile station may be used for both distance reporting and distance measurement, by sub-carrier modulation or other known forms of multiplexing. Similarly, various functions may be combined at the reference station, in order to minimize the equipment and frequency spectrum required.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for transmitting from a mobile station to a reference station information as to the distance and direction of said mobile station from said reference station, including means at said reference station for generating a periodic timing signal and means for transmitting said timing signal to said mobile station, means at said mobile station for producing a distance signal varying according to the distance of said mobile station from said reference station, and means periodically transmitting said distance signal to said reference station during intervals which are delayed with respect to said timing signal by an amount corresponding to the direction of said mobile station from said reference station.

2. A system for transmitting from a mobile station to a reference station information as to the distance and direction of said mobile station from said reference station, including means at said reference station for generating a periodic timing signal and means for transmitting said timing signal to said mobile station, means at said mobile station for producing a signal having a variable characteristic and means for varying said characteristic according to the distance of said mobile station from said reference station, transmitter means at said mobile station, and means applying said distance characteristic signal to said mobile station transmitter means substantially only during brief intervals which are delayed with respect to the beginning of each period of said timing signal by an amount corresponding to the direction of said mobile station from said reference station.

3. In a system of the described type, a station at a reference location including a source of periodic timing signals and means transmitting said timing signals to at least one mobile station, said mobile station including circuit closing means responsive to said timing signal and to the direction of said mobile station from said reference station to close momentarily at an instant during each period of said timing signals which depends upon said direction, means generating a signal having a variable characteristic and means varying said characteristic according to the distance of said mobile station from said reference station, a transmitter at said mobile station and means including said circuit closing means for applying said distance-characteristic signal to said mobile station transmitter; a receiver at said reference station responsive to said mobile station transmitter to reproduce said distance-characteristic signals, and means at said reference station responsive to said reproduced distance-characteristic signals and their timing with respect to said timing signals to indicate the distance and direction of said mobile station from said reference station.

4. In a system of the described type, a station at a reference location including a facsimile recorder scanning a recording medium periodically along a coordinate representing azimuth, a source of periodic timing signals synchronized with said scanning and means transmitting said timing signals to at least one mobile station, said mobile station including circuit closing means responsive to said timing signal and to the direction of said mobile station from said reference station to close momentarily at an instant during each period of said timing signals which depends upon said direction, means generating a signal having a variable characteristic and means varying said characteristic according to the distance of said mobile station from said reference station, a transmitter at said mobile station and means including said circuit closing means for applying said distance-characteristic signal to said mobile station transmitter; a receiver at said reference station responsive to said mobile station transmitter to reproduce said distance-characteristic signals, and means at said reference station for separating said reproduced signals according to the distances they represent and applying said signals to respective points on said recording medium along a coordinate representing distance to produce a visual record of the distance and direction of said mobile station from said reference station.

5. In a system of the described type, a station at a reference location including a facsimile recorder scanning a recording medium periodically along a circular coordinate representing azimuth, a source of periodic timing signals synchronized with said scanning and means transmitting said timing signals to at least one mobile station, said mobile station including circuit closing means responsive to said timing signal and to the direction of said mobile station from said reference station to close momentarily at an instant during each period of said timing signals which depends upon said direction, means generating a signal having a variable frequency and means varying said frequency according to the distance of said mobile station from said reference station, a transmitter at said mobile station and means including said circuit closing means for applying said variable frequency signal to said mobile station transmitter; a receiver at said reference station responsive to said mobile station transmitter to reproduce said variable frequency signals, band pass filter means at said reference station for separating said reproduced signals according to the distances they represent and applying said signals to respective points on said recording medium along radial coordinates representing distance to produce a map-like visual record of the distance and direction of said mobile station from said reference station.

6. In an air traffic control system, the combination at a mobile station of an omnidirectional radio range receiver providing two outputs whose time relationship depends upon the direction of said mobile station from a reference point; means providing a signal characteristic of the distance of said mobile station from said reference point; means providing a timing signal, and means transmitting said distance-characteristic signal only at instants delayed with respect to said timing signal by an amount which depends upon the time relationship between said two outputs from said receiver.

7. In an air traffic control system, the combination at a mobile station of an omnidirectional radio range receiver providing a constant phase reference signal output and a directional phase output whose phase relationship to said reference signal depends upon the direction of said mobile station from a reference point; means providing a signal characteristic of the distance of said mobile station from said reference point; a transmitter, means providing a timing signal, and means periodically applying said distance-characteristic signal to said transmitter at instants delayed with respect to said timing signal by an amount which depends upon the phase relationship between said reference signal and said directional signal.

8. In an air traffic control system, the combination at a mobile station of an omni-directional radio range receiver for providing two outputs whose time relationship depends upon the direction of said mobile station from a reference point; radio distance measuring equipment at said mobile station and auxiliary equipment at said reference point adapted to cooperate therewith to measure the distance of said mobile station from said reference point; means providing a repetitive timing signal, and means responsive to said two outputs and to said timing signal to prevent operation of said distance measuring equipment at said mobile station except at repetitive instants delayed with respect to said timing signal by an amount corresponding to said direction.

9. The invention set forth in claim 8, including a distance indicator system at said mobile station, said distance indicator system including a servomotor, and means responsive to the repetitive output of said distance measuring equipment to energize said servomotor according to the difference between the actual position of said servomotor and the position corresponding to the distance measured by said distance measuring equipment, whereby said servomotor is maintained substantially continuously at a position which corresponds substantially to said measured distance; and means responsive to the position of said servomotor for producing a signal characteristic of said distance.

10. The invention set forth in claim 9, further including a radio transmitter at said mobile station, means for modulating said transmitter with said distance-characteristic signal, and means to prevent operation of said transmitter except at instants delayed with respect to said timing signal by an amount corresponding to the direction of said mobile station from said reference point.

JOSEPH LYMAN.
GEORGE B. LITCHFORD.

REFERENCES CITED

The following references are of record in the file of this patent:

UNITED STATES PATENTS

| Number | Name | Date |
| --- | --- | --- |
| 2,252,083 | Luck | Aug. 12, 1941 |
| 2,421,106 | Wight et al. | May 27, 1947 |
| 2,467,202 | Gardiner | Apr. 12, 1949 |
| 2,480,123 | Deloraine et al. | Aug. 30, 1949 |
| 2,483,097 | McIlwain | Sept. 27, 1949 |
| 2,490,268 | Herbst | Dec. 6, 1949 |
| 2,513,282 | Busignies | July 4, 1950 |
| 2,517,540 | Busignies | Aug. 8, 1950 |
| 2,535,038 | Busignies | Dec. 26, 1950 |
| 2,561,345 | Deloraine | July 24, 1951 |